(12) United States Patent
Johnson

(10) Patent No.: US 6,887,375 B2
(45) Date of Patent: May 3, 2005

(54) SYSTEM TO SAVE AND RECYCLE DOMESTIC WATER

(76) Inventor: William Chando Johnson, 3728 Storms Creek Rd., Urbana, OH (US) 43078

(*) Notice: Subject to any disclaimer, the term of this patent is extended or adjusted under 35 U.S.C. 154(b) by 0 days.

(21) Appl. No.: 10/352,715

(22) Filed: Jan. 28, 2003

(65) Prior Publication Data

US 2004/0144704 A1 Jul. 29, 2004

(51) Int. Cl.$^7$ .................................................. C02F 1/00
(52) U.S. Cl. ................. 210/170; 210/195.1; 210/257.1; 210/172; 52/16; 405/36
(58) Field of Search ................................ 210/167, 170, 210/172, 194, 195.1, 196, 257.1, 258, 259; 52/12, 16; 405/36, 50

(56) References Cited

U.S. PATENT DOCUMENTS

| | | | | |
|---|---|---|---|---|
| 4,162,218 A | * | 7/1979 | McCormick | 210/167 |
| 4,228,006 A | * | 10/1980 | Hanna | 210/170 |
| 4,812,237 A | * | 3/1989 | Cawley et al. | 210/605 |
| 5,106,493 A | * | 4/1992 | McIntosh | 210/195.1 |
| 5,147,532 A | * | 9/1992 | Leek, Jr. | 210/257.1 |
| 5,192,426 A | * | 3/1993 | DeCoster et al. | 210/170 |
| 5,288,412 A | * | 2/1994 | Voorhees et al. | 210/170 |
| 5,396,745 A | * | 3/1995 | Klein | 210/167 |
| 5,498,330 A | * | 3/1996 | Delle Cave | 210/167 |
| 6,139,729 A | * | 10/2000 | Gonzalez, Jr. | 210/170 |

FOREIGN PATENT DOCUMENTS

DE 19901975 A1 * 7/2000

* cited by examiner

Primary Examiner—Christopher Upton
(74) Attorney, Agent, or Firm—William M Selenke

(57) ABSTRACT

The invention is a system for the processing and recycling of water. Rain water or snow from a roof or other areas that collect rain water is transferred via a down spout to a rain water storage vessel. This water is transferred with a holding tank transfer pipe from the vessel to an unpurified water reservoir. A second source of water is the household domestic waste water, defined as gray water, transferred via waste water pipe to a septic tank then via discharge pipe to a open bottom ground reservoirs. The water from the dry well is transferred via unpurified water reservoir pipe from the dry well to the unpurified water reservoir. A third source of water, well water, (which can include commercial water) is transferred via well water pipe to the unpurified water reservoir. Water from the unpurified water reservoir is dispensed via a water distribution mechanism. The water distribution system further has a suction pipe which ducts water to a purification distribution system. The purification distribution system has in operation configuration a pump, valves, a purification means and distribution pipes to deliver the water to its selected sites. The purification means include one or more of the class of purification means including centrifugation, activated charcoal, air bubbles, ozone, oxygen, UV light, halogens, sunlight, or heat. In certain embodiments of the present invention highly contaminated "black water" is disposed via a commercial sewer.

5 Claims, 2 Drawing Sheets

US 6,887,375 B2

SYSTEM TO SAVE AND RECYCLE DOMESTIC WATER

FIELD OF INVENTION

In the various semi-arid and desert regions of the world there is a great need to conserve and recycle domestic water. Domestic water is water used for used for drinking or household needs and animal thirst. The present invention is concerned with those constructed systems that collect unpurified water from weather precipitation, domestic waste water, well water, and other water from regional distribution systems, and process them through open bottom ground reservoirs and other long term storage and purifications vats.

BACKGROUND OF INVENTION

Man's ability to survive in area of limited water has depended upon his ability to catch and save the excess water in time of rain to be used in time of drought. Iron Age and later peoples used cisterns to catch and store rainwater. See Jeremiah 2:13. Open bottom ground reservoirs are commonly used to catch and dispose of excess water. For example, U.S. Pat. No. 5,650,065 disclosed a skimmer cover to prevent larger particles of debris into the dry well. What has been lacking in a complete system whereas the open bottom ground reservoirs can be used to catch, purify and store water useful for domestic and animal water from such varied sources as water wells, rain water, domestic waste water and so forth.

The present invention is concerned with two problems to be solved. The first problem or situation concerns domestic or houseful water. This domestic water system would generally include water to quench the thirst of animals as well as human consumption such as drinking or cleaning purposes. A second problem concerns commercial, retail, or other industrial applications. The present invention will process and recycle waste water from commercial establishments such as factories and retail stores. It will process such gray water such as water from hand, bath, bath shower, or dish washing as well as hose downs of concrete floors and surfaces. The present invention is not designed to take care of large amounts of solid human or animal waste or more complex industrial waste. For this reason the present invention specifies that large amounts of solid human or animal fecal waste sewage, i.e., "black water," would be disposed via commercial sewage systems. Likewise, heavily contaminated water from industrial processes, whether toxic or non-toxic, would be disposed via commercial disposal.

The present invention is concerned with capturing and retaining water that is less contaminated. At an important source of such water is water from rain or snow, or well water. Typically, rainwater or well water is relatively pure. However more processing is often useful prior to use as potable or drinking water.

Further, the present invention is concerned with assembling as a package of various common features suited for individual or isolated households, or small industrial processes. These households or factories can purchase their water system as a single source to be assembled in a standard manner. In fact, the various components of this system are items that are commercially available and as individual units.

SUMMARY OF INVENTION

The invention is a system for the processing and recycling of water. Rain water or snow from a roof or other areas that collect rain water is transferred via a down spout to a rain water storage vessel. This water is transferred with a holding tank transfer pipe from the vessel to an unpurified water reservoir. A second source of water is the household domestic waste water, gray water, transferred via waste water pipe to a septic tank then via discharge pipe to a dry well. The water from the open bottom ground reservoirs is transferred via unpurified water reservoir pipe from the dry well to said unpurified water reservoir. A third source of water, well water, (which can include commercial water) is transferred via well water pipe to said unpurified water reservoir. Water from the unpurified water reservoir is dispensed via a water distribution mechanism. The system to save and recycle domestic water further has a suction pipe which ducts water to a purification distribution system. The purification distribution system has in a pump, valves, a purification means and distribution pipes to deliver the water to its selected sites which includes faucets for sinks gardens, bath and bath showers and outside faucets.

The purification means include one or more of the class of purification means including centrifugation, activated charcoal, air bubbles, ozone, oxygen, UV light, halogens, sunlight, or heat. In certain embodiments of the present invention highly contaminated "black water" is disposed via a commercial sewer.

DETAIL DESCRIPTION OF THE FIGURES

Figure 1:
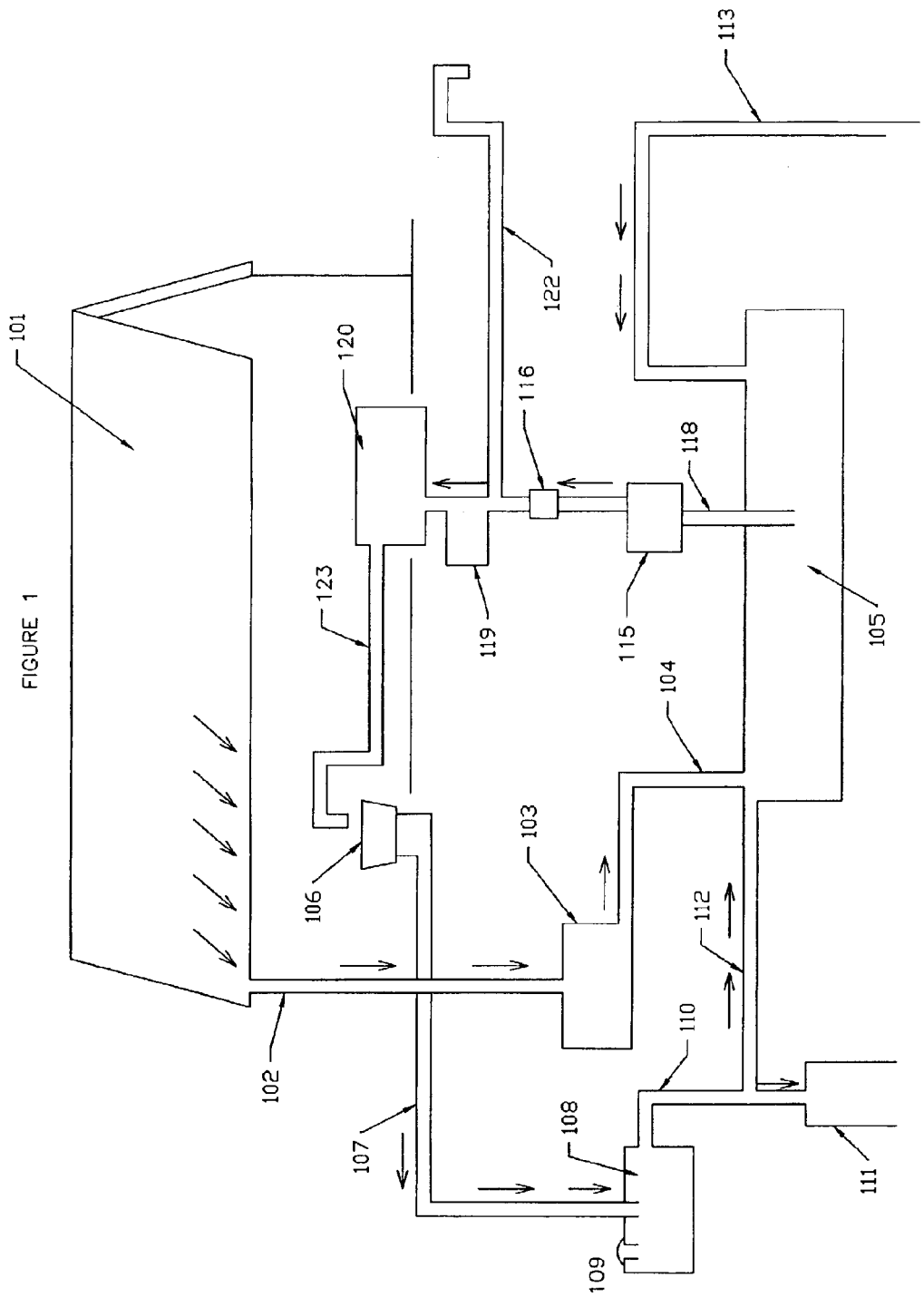
FIG. 1 is a schematic for the system to conserve and recycle domestic water for use in an individual houseful.

FIG. 1 shows the first source (or collection area) 101 for domestic water. That is, rainwater is collected from the roof 101. It is to be noted that other relatively clean areas such as a little used patio maybe also be used to collect water. However, generally roofs collect rain or snow water in a relatively clean condition. Water from roof 101 is collected via downspout 102 to a rainwater storage vessel 103. In turn, collected rainwater from rainwater storage vessel 103 flows through holding tank transfer pipe 104 to the unpurified water reservoir 105.

A second source of domestic water for the collection system is domestic gray waste water 106. This domestic gray water 106 is collected and transferred via waste water pipe 107 to septic tank 108. Septic tank 108 has a manhole 109 so that it can be cleaned out. Note, water from septic tank 108 moves by gravity through discharge pipe 110 to dry well (open bottom ground reservoir) 111. Likewise septic tank water from discharge pipe 110 is transferred via open bottom ground reservoir 111 to unpurified water reservoir pipe 112 to the unpurified water reservoir 105. In addition, a third source of water, well water, maybe transferred via well water pipe 113 to unpurified water reservoir 105. The unpurified combination water from rainwater, septic tank, and well water is relatively clean and may be distributed a water distribution mechanism.

This unpurified combination water is pumped via a pump 115 through pipe 118 through valve 116 through purification system 119. A system for the processing and recycling of water include one or more of the class of purification means such as centrifugation, activated charcoal, air bubbles, ozone, oxygen, halogens, sunlight, or heat.

The purified water for domestic use is stored in purified water tank 120. Potable and purified water is distributed from purified water tank 120 via pipe 123. However, there may be a bypass 122 so that the unpurified water from 105 maybe be pumped to domestic animals or limited garden irrigation as part of the water distribution system of faucets and pipes.

Figure 2:
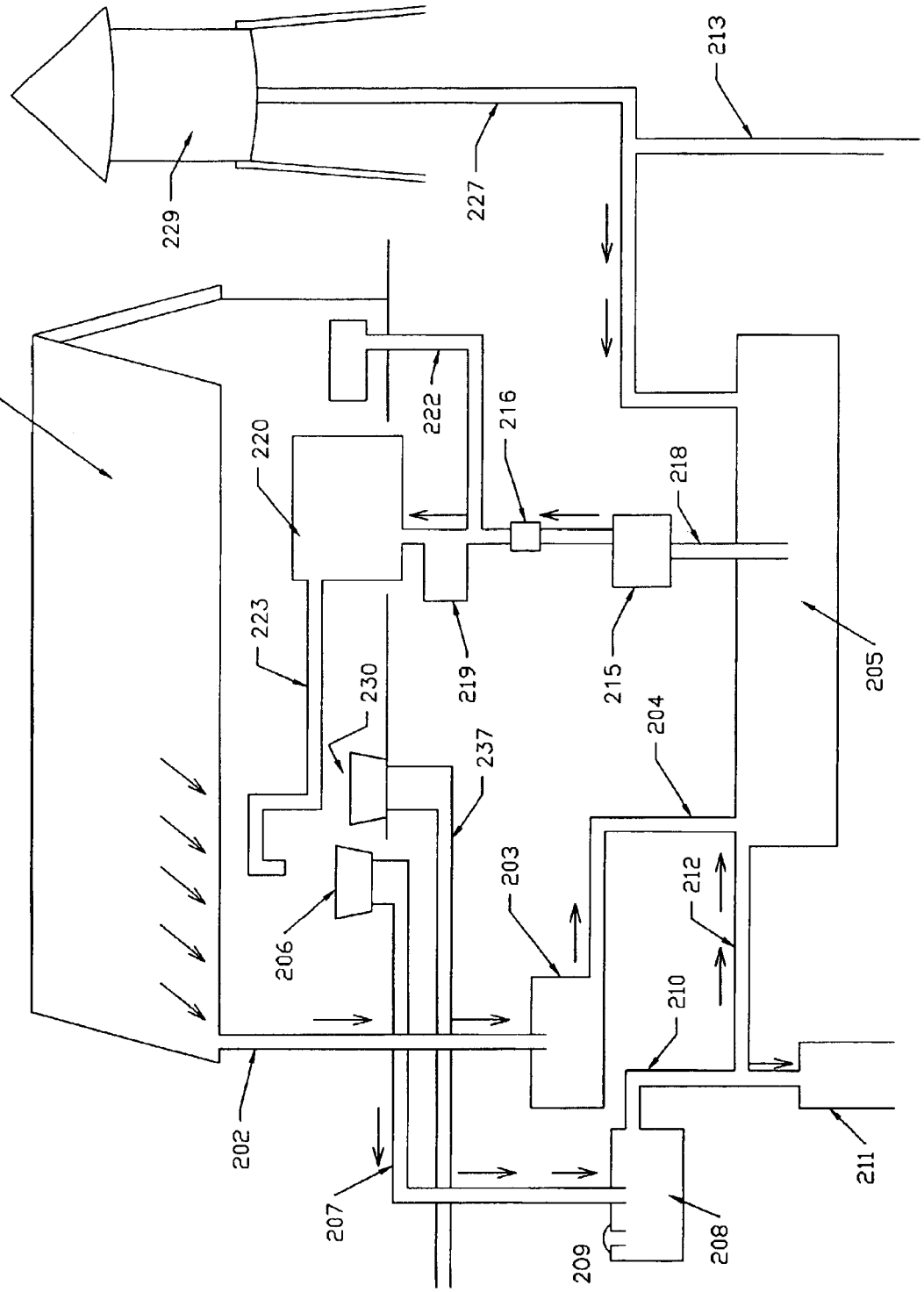
FIG. 2 illustrates this system in use in a small commercial facility.

FIG. 2 shows a system to save and recycle domestic water for a small business or factory. The first collection basin for this second embodiment is roof collection area 201. That is, rainwater is collected from the roof 201. It is to be noted that other relatively clean areas such as a little used patio maybe also be used to collect water. However, generally roofs collect rain or snow water in a relatively clean condition. Water from roof 201 is collected via downspout 202 to an optional rainwater storage area 203. In turn, collected rainwater from rainwater storage area 203 flows via gravity through via pipe 204 to the unpurified water reservoir 205.

A second source of water for the collection system is gray waste water 206. Gray waste water 206 is collected and flows via pipe 207 to septic tank 208. Septic tank 208 has a manhole 209 so that it can be cleaned out. Because of the volume and greater numbers of users, highly contaminated "black water" 230 (or human urine and fecal waste water 230) is disposed via common sewer pipe 237. Note, water from septic tank 208 is transferred via pipe 210 to open bottom ground reservoirs 211. Likewise septic tank water from pipe 210 flows via pipe 212 to the unpurified water reservoir 205. In addition, a third source of water, well water, or commercial water may be stored in a stand pipe or water tower. This well or commercial water may be pumped directly or via pipe 227 to unpurified water reservoir 205. The unpurified combination water from rainwater, septic tank, and well water is relatively clean. This unpurified combination water is transferred via pipe 218 a pump 215 through valve 216 through purification system 219. The purification system 219 may include such purification means including centrifugation, activated charcoal, air bubbles, ozone, oxygen, halogens, sunlight, or heat.

The purified water for drinking is stored in purified water tank 220. Potable or purified drinking water is transferred and used via purified pipe 223. However, there may be a bypass 222 so that the unpurified water from 205 maybe pumped to non potable factory uses such as floor cleaning and plant irrigation.

I claim:

1. A system for the processing and recycling of water comprising:

a first source of water from a roof or other areas that collect rain water or snow water, means for gravity flow of the rain or snow water with a down spout to a rain water storage vessel;

a transfer pipe for directing the gravity flow of the water from said rain storage vessel to an unpurified water reservoir;

a second source of water from the collection of gray waste water;

means for gravity flow of that gray waste water via a waste water pipe to a septic tank;

means for transfer of the waste water from the septic tank via a discharge pipe to an open bottom ground reservoir;

means for gravity flow from said open bottom ground reservoir through an unpurified water reservoir pipe to said unpurified water reservoir;

a third source of water from well water, and a well water pipe connected to said unpurified water reservoir;

means wherein water from said unpurified water reservoir is dispensed via outside faucets for gardens and drinking water for animals.

2. A system for the processing and recycling of water as in claim 1 wherein said water distribution system further comprises a suction pipe in communication with said unpurified water reservoir;

wherein said suction pipe ducts water to a purification distribution system;

said purification distribution system has connected in series a pump, valves, a purification means and distribution pipes to deliver the water to faucets for sinks gardens, bath and bath showers, and outside faucets.

3. A system for the processing and recycling of water as in claim 2 wherein said purification means include one or more of the class of purification means including centrifugation, activated charcoal, air bubbles, ozone, oxygen, UV light, halogens, sunlight, or heat.

4. A system for the processing and recycling of water as in claim 1 wherein highly contaminated "black water" is disposed via a commercial sewer.

5. A system for the processing and recycling of water as in claim 1 wherein said well water includes commercial water.

* * * * *